(12) United States Patent
Kawai et al.

(10) Patent No.: US 12,149,185 B2
(45) Date of Patent: Nov. 19, 2024

(54) POWER CONVERSION DEVICE (71) Applicant: Mitsubishi Electric Corporation, Tokyo (JP)

(72) Inventors: Yu Kawai, Tokyo (JP); Kikuo Izumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 190 days.

(21) Appl. No.: 17/921,176

(22) PCT Filed: May 21, 2020

(86) PCT No.: PCT/JP2020/020120
§ 371 (c)(1),
(2) Date: Oct. 25, 2022

(87) PCT Pub. No.: WO2021/234910
PCT Pub. Date: Nov. 25, 2021

(65) Prior Publication Data
US 2023/0170826 A1    Jun. 1, 2023

(51) Int. Cl.
*H02M 7/539* (2006.01)
*H02M 1/00* (2006.01)
(Continued)

(52) U.S. Cl.
CPC ....... *H02M 7/5395* (2013.01); *H02M 1/0006* (2021.05); *H02M 7/53873* (2013.01)

(58) Field of Classification Search
CPC ............ H02M 7/5395; H02M 1/0006; H02M 7/53873; H02M 7/539; H02M 1/0003; H02M 7/5387
See application file for complete search history.

(56) References Cited

U.S. PATENT DOCUMENTS 9,515,577 B2 * 12/2016 Kidera ................ H02M 7/5387
9,806,638 B2 * 10/2017 Yoo .................... H02M 7/53875
(Continued)

FOREIGN PATENT DOCUMENTS

JP    63-64574 A    3/1988
JP    6-98559 A     4/1994
(Continued)

OTHER PUBLICATIONS

International Search Report and Written Opinion mailed on Aug. 11, 2020, received for PCT Application PCT/JP2020/020120, filed on May 21, 2020, 9 pages including English Translation.
(Continued)

*Primary Examiner* — Adolf D Berhane
(74) *Attorney, Agent, or Firm* — XSENSUS LLP (57) ABSTRACT

A power conversion device includes an inverter that generates an inverter voltage, a filter that receives the inverter voltage and outputs an output voltage, a detector that detects a DC component of the output voltage, a feedback controller that receives an AC voltage command and the DC component and determines an inverter voltage command such that the DC component is equal to a target value which is zero or a value corresponding to an offset error of the detector, and a PWM controller that receives the inverter voltage command and performs pulse width modulation control of the inverter. The feedback controller computes a compensation amount for compensating for the DC component and determines, as the inverter voltage command, the AC voltage command on which a product of an absolute value of a sine wave synchronized with a period of the AC voltage command and the compensation amount is superimposed.

14 Claims, 10 Drawing Sheets

(51) Int. Cl.
H02M 7/5387 (2007.01)
H02M 7/5395 (2006.01)

(56) References Cited

U.S. PATENT DOCUMENTS

| | | | |
|---|---|---|---|
| 11,646,665 B2 * | 5/2023 | Wu | H02M 1/0045 327/109 |
| 2009/0225571 A1 | 9/2009 | Eldery et al. | |
| 2023/0402927 A1 * | 12/2023 | Kawai | H02M 3/3353 |

FOREIGN PATENT DOCUMENTS

| JP | 2008-15899 A | 1/2008 |
|---|---|---|
| JP | 2011-78290 A | 4/2011 |

OTHER PUBLICATIONS

Extended European Search Report issued May 23, 2023 in European Patent Application No. 20936338.1, 8 pages.
JP Office Action issued Jul. 2, 2024, in corresponding JP Patent Application 2022-524805, 10pp.

* cited by examiner

CORRECTION COMPONENT
SUPERIMPOSED ON
AC VOLTAGE COMMAND

FIG.8

CORRECTION COMPONENT
SUPERIMPOSED ON
AC VOLTAGE COMMAND

POWER CONVERSION DEVICE

CROSS-REFERENCE TO RELATED APPLICATION

The present application is based on PCT filing PCT/JP2020/020120, filed May 21, 2020, the entire contents of which are incorporated herein by reference.

TECHNICAL FIELD

The present disclosure relates to a power conversion device.

BACKGROUND ART

A power conversion device including an inverter that converts a direct-current (DC) voltage into an alternate-current (AC) voltage has conventionally been known. Such a power conversion device is connected with various loads and can generate DC components corresponding to load conditions in its output voltage. Japanese Patent Laying-Open No. 06-098559 (PTL 1) discloses a circuit for suppression of such DC components. The circuit disclosed in PTL 1 includes a pulse signal modulator that changes a pulse signal for operating a switching element of an inverter circuit in accordance with the magnitude of a DC component, which is included in an AC output of the inverter circuit, per half period so as to cancel the DC component.

A power conversion device for generating a voltage, which mimics a power grid, independently of the power grid can be connected with a grid interconnection device serving as a load. For protection from bodily injury, safety of a facility, and recovery of a grid during an isolated operation in the event of a power grid loss, the grid interconnection device takes measures to prevent an isolated operation which is defined in accordance with the grid-interconnection code (JEAC9701). This measure includes an isolated operation detection function and a function of disconnecting the grid interconnection device via a protection relay or the like when the isolated operation detection function determines the isolated operation.

Types of the isolated operation detection function include a passive isolated operation detection function that detects changes in the phase, distortion, and frequency of a grid voltage, and an active isolated operation detection function that promotes such changes from the frequency change in grid voltage. The active isolated operation detection function injects reactive power so as to promote such changes from a frequency change in the AC voltage of a measurement target.

CITATION LIST

Patent Literature

PTL 1: Japanese Patent Laying-Open No. 06-098559

SUMMARY OF INVENTION

Technical Problem

A power conversion device is connected with a load and a grid interconnection device. When a frequency change occurs upon generation of a DC component corresponding to load conditions in an output voltage of the power conversion device, reactive power may be injected by the active isolated operation detection function of the grid interconnection device. The frequency change corresponds to variations in the zero-cross interval determined by a positive half-wave period and a negative half-wave period. The injection of reactive power promotes a frequency change in the output voltage of the power conversion device. As a result, the grid interconnection device is finally disconnected due to the isolated operation detection, and the grid interconnection device is no longer available. In the technique disclosed in PTL 1, a pulse signal changes in accordance with the magnitude of a DC component per half period. It thus takes time to suppress the DC component and the frequency change generated in the output voltage of the power conversion device. In particular, when the DC component varies transiently as in the case where the load is turned on or turned off, the DC component and the frequency change cannot be suppressed at an early stage.

The present disclosure has been made to solve the above-mentioned problem. An object of the present disclosure is to provide a power conversion device that can suppress, at an early stage, a DC component and a frequency change generated in an output voltage.

Solution to Problem

A power conversion device according to an aspect of the present disclosure includes at least one circuit to receive a DC input voltage and perform power conversion. Each of the at least one circuit includes an inverter to receive the DC input voltage and generate an inverter voltage, a filter to receive the inverter voltage and output an output voltage, a detector to detect a DC component of the output voltage, a feedback controller to receive an AC voltage command and the DC component and determine an inverter voltage command such that the DC component is equal to a target value, and a PWM controller to receive the inverter voltage command and perform pulse width modulation control of the inverter. The target value is zero or a value corresponding to an offset error of the detector. The feedback controller computes a compensation amount for compensating for the DC component, and determines, as the inverter voltage command, the AC voltage command on which a product of an absolute value of a sine wave and the compensation amount is superimposed, the sine wave being synchronized with a period of the AC voltage command.

Advantageous Effects of Invention

With the power conversion device according to an aspect of the present disclosure, the feedback controller continuously detects a DC component and determines a voltage command to the inverter such that the DC component is equal to zero or a value corresponding to an offset error. This suppresses the DC component of the output voltage from the filter at an early stage. Moreover, the inverter voltage command is determined by superimposing, on the AC voltage command, the product of the absolute value of the sine wave synchronized with the period of the AC voltage command and the compensation amount, thereby suppressing a frequency change in the output voltage from the filter at an early stage. Thus, the DC component and the frequency change, which have occurred in the output voltage, are suppressed at an early stage.

DESCRIPTION OF EMBODIMENTS

Embodiments of the present disclosure will now be described in detail with reference to the accompanying drawings. While a plurality of embodiments will be described below, it has been originally intended at the time of filing of the present application to appropriately combine the configurations described in the embodiments. In the accompanying drawings, the same or corresponding portions are denoted by the same reference characters, and the description thereof will not be repeated. Further, the forms of the components described in the whole text of the specification are given merely by way of example, and the present disclosure is not limited thereto.

Embodiment 1

Configuration of Power Conversion Device

Figure 1:
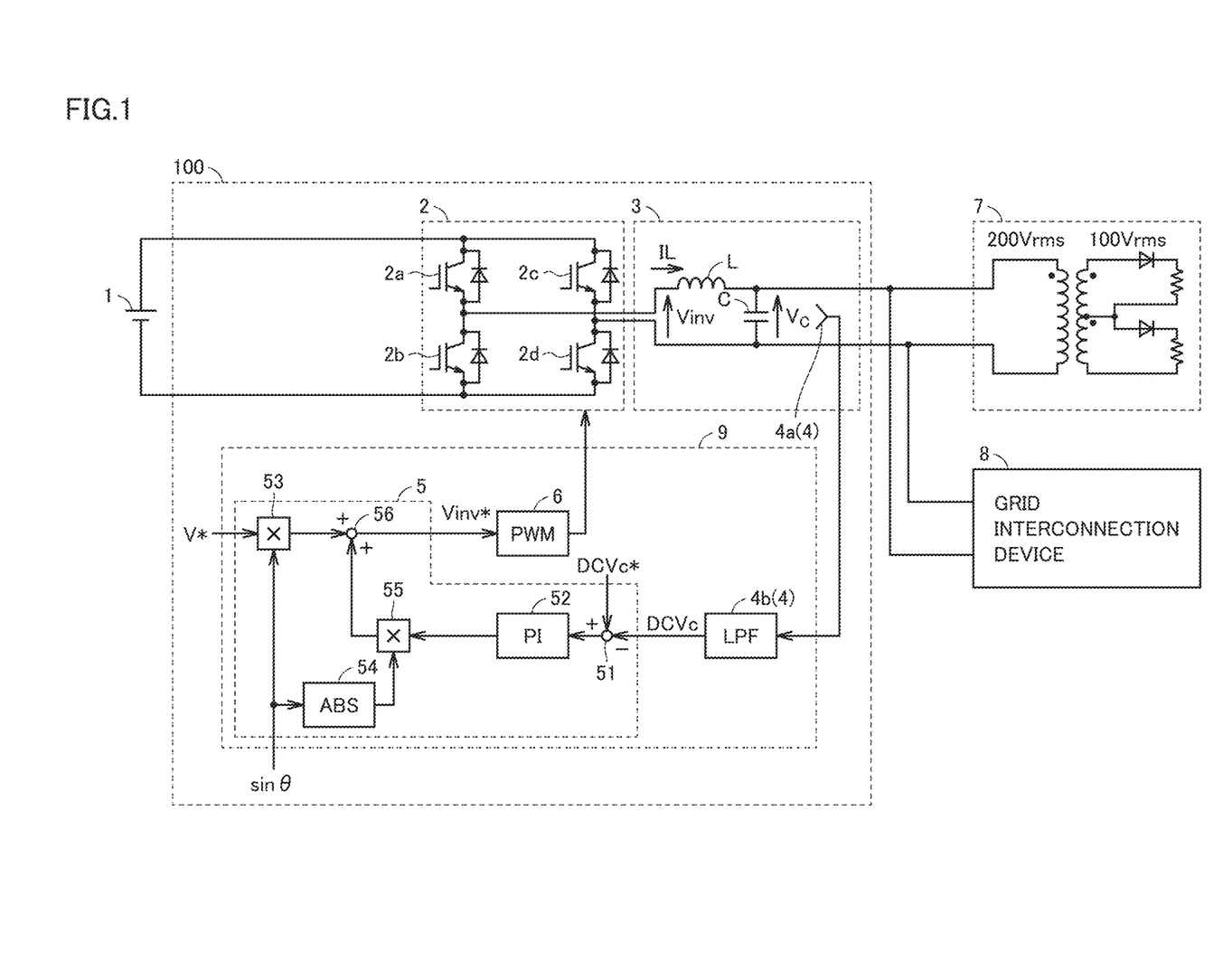
FIG. 1 shows a configuration of a power conversion device according to Embodiment 1.

FIG. 1 shows a configuration of a power conversion device according to Embodiment 1. As shown in FIG. 1, a power conversion device 100 includes an inverter 2, a filter 3, and an inverter control circuit 9.

Inverter 2 receives a DC input voltage from a DC power supply 1 and generates an AC voltage (hereinafter referred to as "inverter voltage" below) Vinv. Inverter 2 is a full-bridge inverter and includes semiconductor switching elements 2a to 2d. In other words, inverter 2 includes a circuit in which two legs, each consisting of a corresponding one of two upper arms (semiconductor switching elements 2a, 2c) and a corresponding one of two lower arms (semiconductor switching elements 2b, 2d), are connected in parallel. Diagonally located semiconductor switching elements of semiconductor switching elements 2a to 2d operate at the same timing. Specifically, semiconductor switching element 2a, which is an upper arm of a left leg, and semiconductor switching element 2d, which is a lower arm of a right leg, perform a switching operation at the same timing. Also, semiconductor switching element 2b, which is a lower arm of the left leg, and semiconductor switching element 2c, which is an upper arm of the right leg, perform a switching operation at the same timing.

Filter 3 receives inverter voltage Vinv and outputs an AC output voltage Vc. Filter 3 illustrated in FIG. 1 is an LC filter including an inductor L and a capacitor C.

Inverter control circuit 9 controls inverter 2. As shown in FIG. 1, inverter control circuit 9 includes a detector 4, a feedback controller 5, and a pulse width modulation (PWM) controller 6.

Detector 4 detects a DC component DCVc of output voltage Vc. For example, detector 4 is composed of a voltage detector 4a, which detects a voltage of capacitor C, and a low-pass filter 4b. Detector 4 smooths an AC component of output voltage Vc to continuously detect DC component DCVc of output voltage Vc.

Feedback controller 5 receives an AC voltage command, DC component DCVc detected by detector 4, and a target value DCVc*, and determines an inverter voltage command Vinv* such that DC component DCVc is equal to target value DCVc*.

The AC voltage command is expressed by the product of its amplitude (maximum value) V* and a sine wave $\sin \theta$ synchronized with its period and corresponds to a target value of output voltage Vc.

Target value DCVc*, which is the target value of DC component DCVc, is set in accordance with an offset error in detector 4. The offset error is a detection error caused by effects such as component constant variations and temperature changes in a path from an input end of voltage detector 4a to an output end of low-pass filter 4b. In the case where there is no offset error, zero is set as target value DCVc*. The case where there is no offset error includes a case where the offset error is negligibly small. In the case where there is an offset error, a value (an offset error itself in the example shown in FIG. 1) corresponding to the offset error is set as target value DCVc*.

Inverter voltage command Vinv* corresponds to a target value of inverter voltage Vinv output from inverter 2.

Feedback controller 5 computes a compensation amount for compensating for DC component DCVc, and determines, as inverter voltage command Vinv*, an AC voltage command on which the product of the absolute value of sine wave $\sin \theta$ synchronized with the period of the AC voltage command and the compensation amount is superimposed.

As shown in FIG. 1, feedback controller 5 includes a subtractor 51, a computation unit 52, a multiplier 53, an absolute value circuit 54, a multiplier 55, and an adder 56.

Subtractor 51 subtracts DC component DCVc from target value DCVc*. In other words, subtractor 51 calculates a deviation between target value DCVc* and DC component DCVc.

Computation unit 52 receives an output of subtractor 51 and computes a compensation amount for compensating for DC component DCVc. Computation unit 52 calculates, for example, a compensation amount by a proportional-integral (PI) computation using the deviation between target value DCVc* and DC component DCVc.

Multiplier 53 multiplies an amplitude V* of the AC voltage command by sine wave $\sin \theta$ synchronized with the period of the AC voltage command.

Absolute value circuit 54 receives sine wave $\sin \theta$ synchronized with the period of the AC voltage command and outputs an absolute value of sine wave $\sin \theta$.

Multiplier 55 multiplies the absolute value of sine wave $\sin \theta$ output from absolute value circuit 54 by the compensation amount output from computation unit 52.

Adder 56 adds an output of multiplier 53 and an output of multiplier 55. Inverter voltage command Vinv* is output from adder 56. The output of multiplier 53 is an AC voltage command. The output of multiplier 55 thus corresponds to the correction component superimposed on the AC voltage command. Adder 56 superimposes the output (correction component) of multiplier 55 on the AC voltage command, thereby generating inverter voltage command Vinv*.

PWM controller 6 receives inverter voltage command Vinv* and performs pulse-width modulation control of inverter 2. Specifically, PWM controller 6 controls ON and OFF of each of semiconductor switching elements 2a to 2d included in inverter 2.

The input end of power conversion device 100 is connected with DC power supply 1. The output end of power conversion device 100 is connected with, for example, load 7 and grid interconnection device 8. The output end of power conversion device 100 may be connected with only any one of load 7 and grid interconnection device 8. The type of load 7 is not particularly limited. Load 7 illustrated in FIG. 1 includes, for example, a transformer and a half-wave rectifier circuit. Load 7 (or a part of load 7) may be detachable from power conversion device 100.

Example Operation

Figure 2:
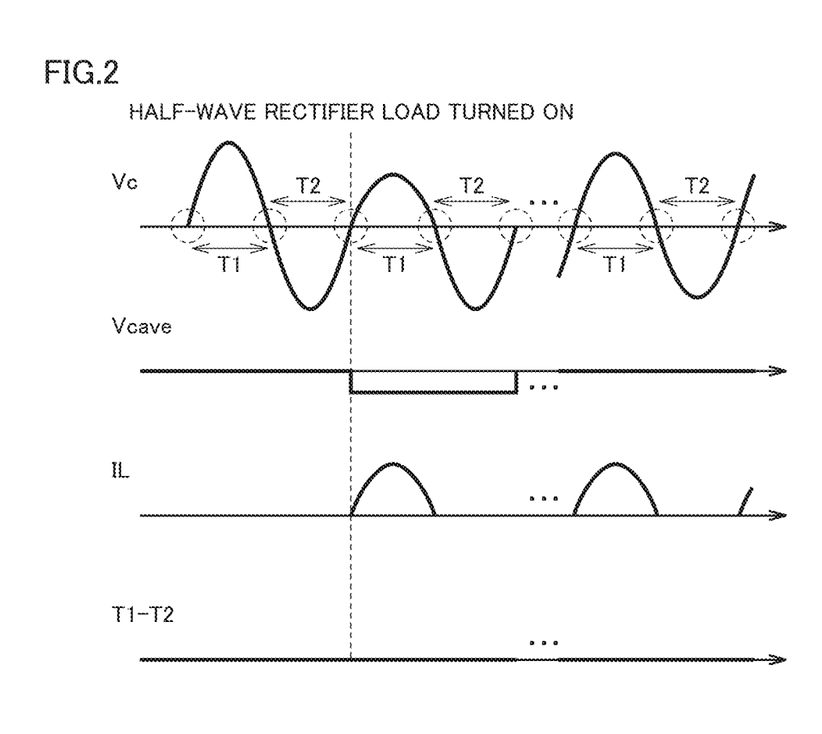
FIG. 2 shows an example operation of the power conversion device according to Embodiment 1.

An example operation of power conversion device 100 will be described with reference to FIG. 2. FIG. 2 shows an example operation of the power conversion device according to Embodiment 1. FIG. 2 shows output voltage Vc, an average value Vcavg of output voltage Vc per fundamental period, a current (hereinafter referred to as "inverter current IL") output from inverter 2, and a difference between a positive half-wave period T1 and a negative half-wave period T2 of output voltage Vc, before and after turning on of load 7 including the half-wave rectifier circuit.

As shown in FIG. 2, inverter current IL becomes equal to zero in one polarity (the negative polarity in the figure) of the positive polarity and negative polarity of output voltage Vc as load 7 including the half-wave rectifier circuit is turned on. The waveform of output voltage Vc decreases, in a one-sided polarity (the positive polarity in the figure) in which a current is generated, by a decrease amount of a reactor voltage from the waveform with symmetrical positive and negative polarities. A voltage decrease in one-sided polarity reduces average value Vcavg of output voltage Vc per fundamental period from zero. Average value Vcavg corresponds to DC component DCVc of output voltage Vc. Although average value Vcavg decreases from zero, positive half-wave period T1 and negative half-wave period T2 of output voltage Vc do not change significantly immediately after turning on of load 7.

The voltage decrease in one-sided polarity generates DC component DCVc of output voltage Vc. Upon generation of DC component DCVc, a compensation amount for compensating for DC component DCVc is computed, and the AC voltage command, on which the product of the absolute value of sine wave sin θ synchronized with the period of the AC voltage command and the compensation amount is imposed, is determined as inverter voltage command Vinv*.

In the example shown in FIG. 2, a negative DC component DCVc is generated due to a decrease in the voltage of the positive polarity. When zero is set as target value DCVc*, thus, a positive deviation is output from subtractor 51 shown in FIG. 1. Computation unit 52 computes a positive compensation amount for compensating for negative DC component DCVc. Feedback controller 5 then determines, as inverter voltage command Vinv*, the AC voltage command on which the product of the absolute value of sine wave sin θ and the positive compensation amount is superimposed. Thus, DC component DCVc of output voltage Vc is adjusted to zero.

Since the AC voltage command, on which the product of the absolute value of sine wave sin θ synchronized with the period of the AC voltage command and the compensation amount is superimposed, is determined as inverter voltage command Vinv*, variations in the voltage near zero cross due to feedback control are small. Consequently, changes in positive half-wave period T1 and negative half-wave period T2 of output voltage Vc can be suppressed.

Comparison with Reference Embodiment

Figure 3:
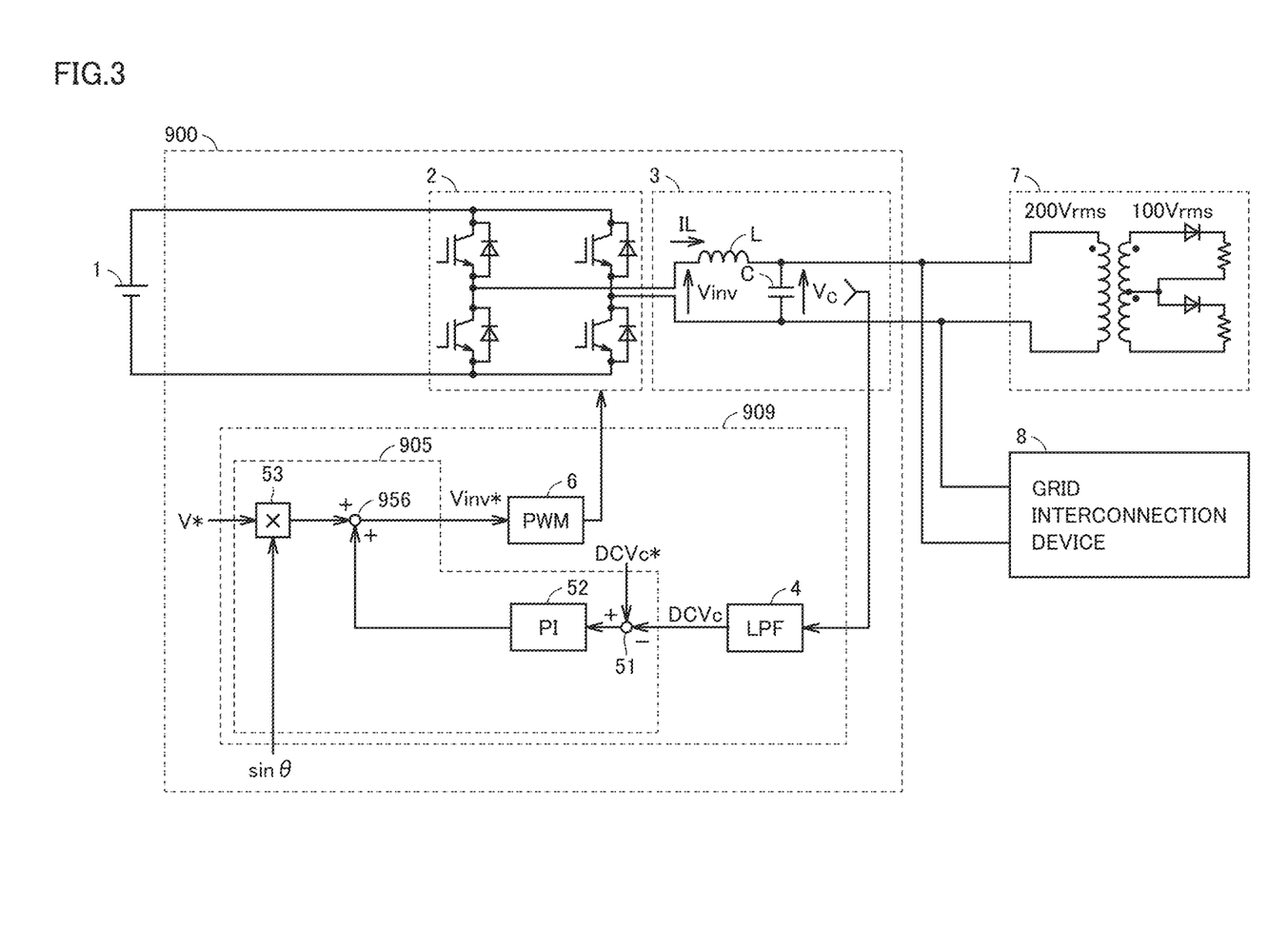
FIG. 3 shows a configuration of a power conversion device according to a reference embodiment.

FIG. 3 shows a configuration of a power conversion device according to a reference embodiment. A power conversion device 900 shown in FIG. 3 includes an inverter control circuit 909 in place of inverter control circuit 9, compared to power conversion device 100 shown in FIG. 1. Inverter control circuit 909 differs from inverter control circuit 9 shown in FIG. 1 in that it includes a feedback controller 905 in place of feedback controller 5. Feedback controller 905 differs from feedback controller 5 shown in FIG. 1 in that it does not include absolute value circuit 54 and multiplier 55 and includes an adder 956 in place of adder 56.

Adder 956 adds an output of multiplier 53 and an output (compensation amount) of computation unit 52. Inverter voltage command Vinv* is output from adder 956. In other words, feedback controller 905 determines, as inverter voltage command Vinv*, an AC voltage command on which the compensation amount itself is superimposed.

Figure 4:
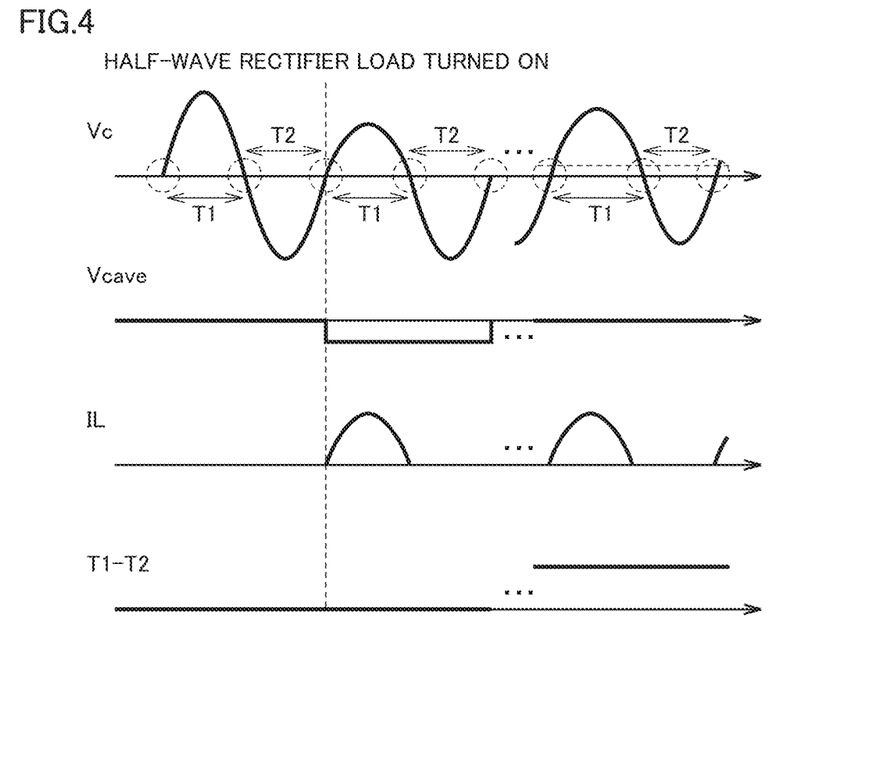
FIG. 4 shows an example operation of the power conversion device according to the reference embodiment.

FIG. 4 shows an example operation of the power conversion device according to the reference embodiment. Similarly to FIG. 2, FIG. 4 shows output voltage Vc, average value Vcavg of output voltage Vc per fundamental period, inverter current IL, and a difference between positive half-wave period T1 and negative half-wave period T2 of output voltage Vc, before and after turning on of load 7 including a half-wave rectifier circuit.

As shown in FIG. 4, a voltage decrease in one-sided polarity reduces average value Vcavg of output voltage Vc per fundamental period from zero. This generates DC component DCVc of output voltage Vc. Upon generation of DC component DCVc, feedback controller 905 computes a compensation amount for compensating for DC component DCVc, and determines, as inverter voltage command Vinv*, an AC voltage command on which the compensation amount is superimposed. Thus, DC component DCVc of output voltage Vc is adjusted to zero. In other words, average value Vcavg of output voltage Vc per fundamental period is adjusted to zero.

However, as the compensation amount itself is superimposed on output voltage Vc in adjustment of average value Vcavg to zero, positive half-wave period T1 and negative half-wave period T2 of output voltage Vc change significantly as shown in FIG. 4.

Significant changes in positive half-wave period T1 and negative half-wave period T2 of output voltage Vc significantly vary the changes in the frequency detected by grid interconnection device 8. As a result, grid interconnection device 8 injects reactive power by the active isolated operation detection function.

Figure 5:
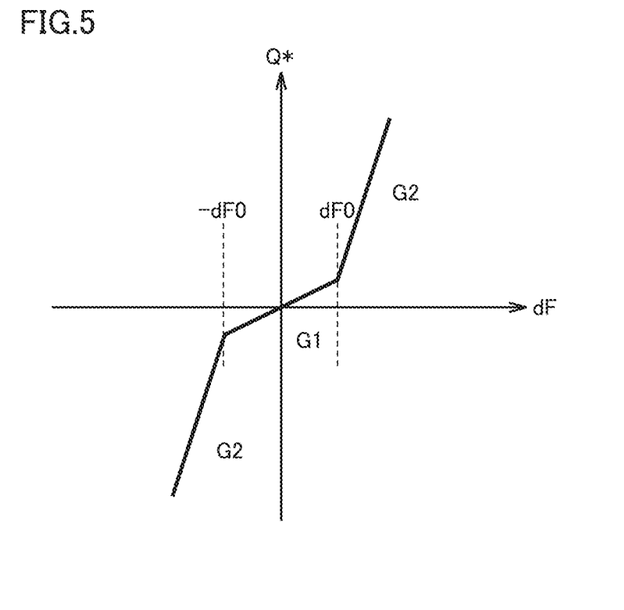
FIG. 5 shows an example method of determining reactive power to be injected by a grid interconnection device.

FIG. 5 shows an example method of determining reactive power to be injected by the grid interconnection device. FIG. 5 is a graph showing the relation between a frequency change amount dF detected by grid interconnection device 8 and reactive power to be injected Q*. Frequency change amount dF is detected based on positive half-wave period T1 and negative half-wave period T2 of the voltage of the AC connection end in grid interconnection device 8. Grid interconnection device 8 determines reactive power to be injected Q* which corresponds to the detected frequency change amount dF in accordance with the graph shown in FIG. 5.

As shown in FIG. 5, grid interconnection device 8 determines reactive power to be injected Q* in accordance with a gain G1 within the range where frequency change amount dF is between −dF0 and dF0, and determines reactive power to be injected Q* in accordance with a gain G2 outside the above-mentioned range. dF0 is a predetermined threshold.

As more reactive power is injected, the voltage of a current path impedance attributable to the reactive power varies more significantly, thus increasing frequency change amount dF. An increase in frequency change amount dF finally leads to disconnection of grid interconnection device 8 due to the isolated operation detection. As shown in FIG. 5, gain G1 is generally set to be smaller than gain G2. It is thus expected that the power conversion device will suppress frequency change amount dF such that frequency change amount dF does not vary from the range between −dF0 and dF0.

In the configuration of power conversion device 900 shown in FIG. 3, positive half-wave period T1 and negative half-wave period T2 of output voltage Vc change significantly as shown in FIG. 4. Thus, the disconnection of grid interconnection device 8 cannot be suppressed which is attributable to the injection of reactive power due to the active isolated operation detection function.

Contrastingly, in the configuration of power conversion device 100 shown in FIG. 1, variations in positive half-wave period T1 and negative half-wave period T2 of output voltage Vc are suppressed as shown in FIG. 2. Thus, the disconnection of grid interconnection device 8 can be suppressed which is attributable to the injection of reactive power due to the active isolated operation detection function.

Comparison with PTL 1 During Transient Variations in DC Component of Output Voltage Next, an example operation during transient variations in DC component DCVc of output voltage Vc immediately after turning on of load 7 will be described with reference to FIGS. 6 to 8.

Figure 6:
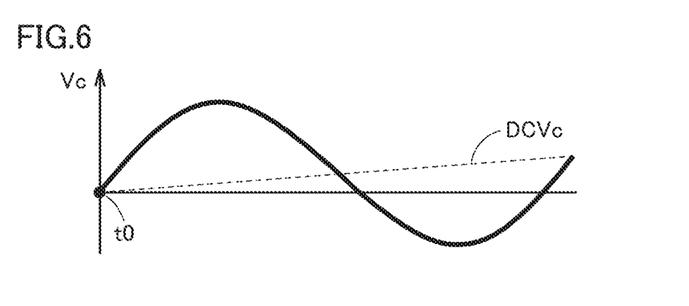
FIG. 6 shows an example output voltage during transitional variations in DC component.

FIG. 6 shows an example of output voltage Vc during transient variations in DC component DCVc. FIG. 7 schematically shows a correction component superimposed on an AC voltage command when the technique described in PTL 1 is used. FIG. 8 schematically shows a correction component superimposed on the AC voltage command in Embodiment 1. FIGS. 7 and 8 each show a correction component generated for output voltage Vc shown in FIG. 6. The correction component shown in FIG. 8 is an output of multiplier 55 shown in FIG. 1.

As shown in FIG. 6, DC component DCVc is zero at a point of time t0 at which load 7 is turned on, and then increases monotonously.

In the technique described in PTL 1, a pulse signal for operating a switching element of an inverter circuit changes in accordance with the magnitude of a DC component per half period. Thus, DC component DCVc is zero at point of time t0, and accordingly, a correction component superimposed on an AC voltage command is zero in the half period that starts from point of time t0, as shown in FIG. 7. As a result, in the half period, the inverter is not adjusted such that DC component DCVc is equal to zero.

At a point of time t1 after a lapse of a half period from point of time t0, a pulse signal corresponding to DC component DCVc is generated. Thus, in the half period that starts from point of time t1, the correction component for reducing DC component DCVc at point of time t1 to zero is superimposed on the AC voltage command. However, DC component DCVc gradually increases also after point of time t1, as shown in FIG. 6. Thus, in the half period that starts from point of time t1, DC component DCVc is once adjusted to near zero immediately after point of time t1, but then gradually increases.

Figure 7:
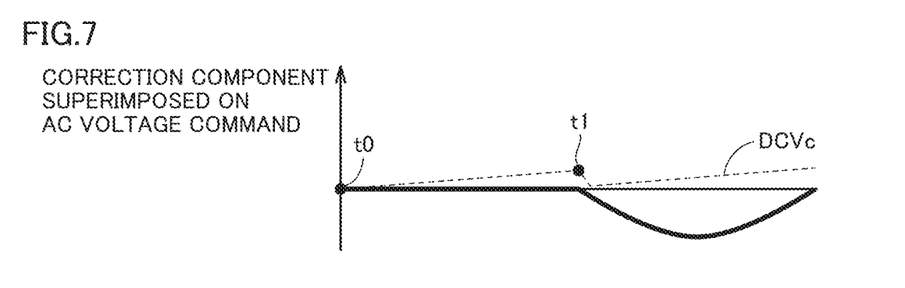
FIG. 7 schematically shows a correction component superimposed on an AC voltage command when the technique described in PTL 1 is used.
Figure 8:
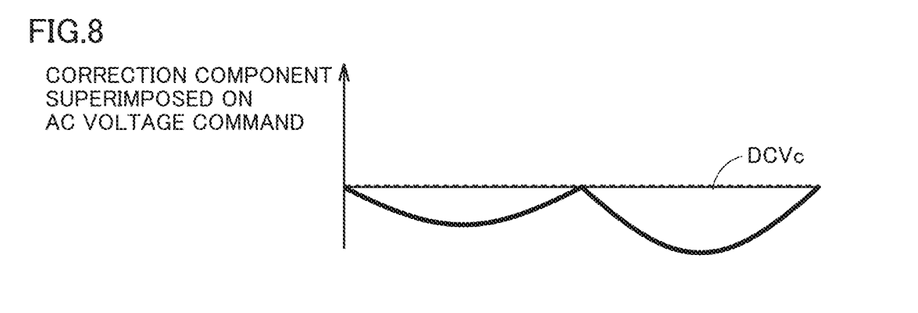
FIG. 8 schematically shows a correction component superimposed on an AC voltage command in Embodiment 1.

When DC component DCVc of output voltage Vc varies transiently as shown in FIG. 7, the technique described in PTL 1 fails to adjust DC component DCVc to zero at an early stage. Since DC component DCVc is not adjusted to zero, the positive half-wave period and the negative half-wave period can also change. As a result, the disconnection of grid interconnection device 8 cannot be suppressed sufficiently which is attributable to the injection of reactive power due to the active isolated operation detection function.

In power conversion device 100 according to Embodiment 1, feedback controller 5 continuously detects DC component DCVc and determines inverter voltage command Vinv* such that DC component DCVc is equal to target value DCVc*. Consequently, DC component DCVc is suppressed at an early stage as shown in FIG. 8.

Further, since the product (correction component) of sine wave sin θ synchronized with the period of the AC voltage command and the compensation amount is superimposed on the AC voltage command, variations in the voltage near zero cross are small. This suppresses changes in positive half-wave period T1 and negative half-wave period T2 of output voltage Vc. As a result, the disconnection of grid interconnection device 8 can be suppressed which is attributable to the injection of reactive power due to the active isolated operation detection function.

Embodiment 2

Figure 9:
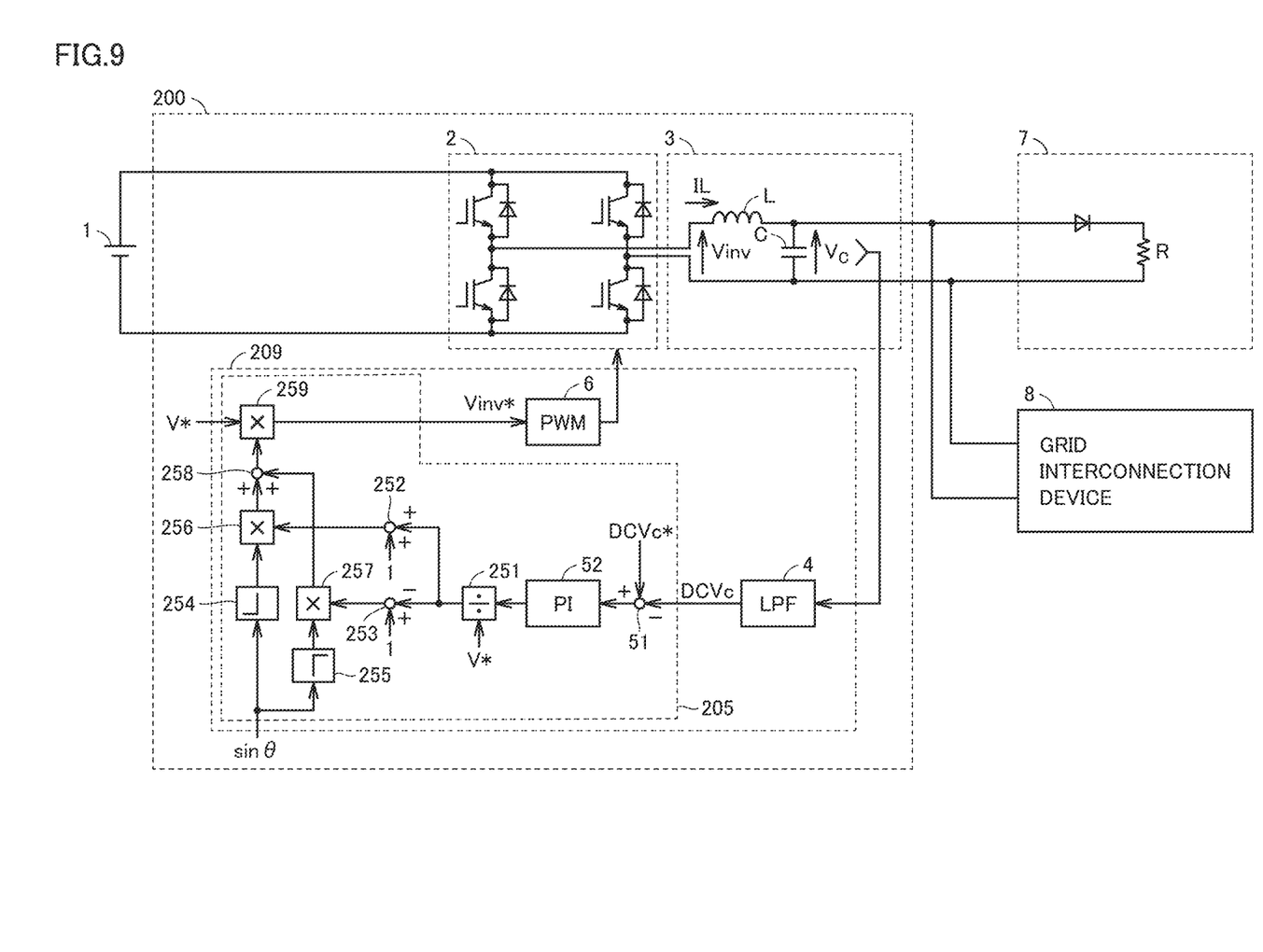
FIG. 9 shows a configuration of a power conversion device according to Embodiment 2.

FIG. 9 shows a configuration of a power conversion device according to Embodiment 2. A power conversion device 200 shown in FIG. 9 differs from power conversion device 100 shown in FIG. 1 in that it includes an inverter control circuit 209 in place of inverter control circuit 9. Inverter control circuit 209 differs from inverter control circuit 9 shown in FIG. 1 in that it includes a feedback controller 205 in place of feedback controller 5.

Similarly to feedback controller 5, feedback controller 205 computes a compensation amount for compensating for DC component DCVc and determines, as inverter voltage command Vinv*, the AC voltage command on which the product of the absolute value of sine wave sin θ synchronized with the period of the AC voltage command and the compensation amount is superimposed.

Feedback controller 205 includes subtractor 51, computation unit 52, a divider 251, an adder 252, a subtractor 253, filters 254, 255, multipliers 256, 257, an adder 258, and a multiplier 259.

Divider 251 divides the compensation amount output from computation unit 52 by amplitude V* of the AC voltage command.

Adder 252 adds an output (i.e., a value obtained by dividing the compensation amount by amplitude V* of the AC voltage command) of divider 251 to one. In other words, (1+compensation amount/V*) is output from adder 252.

Subtractor 253 subtracts the output of divider 251 from one. In other words, (1−compensation amount/V*) is output from subtractor 253.

Filter 254 passes a portion of not less than zero of sine wave sin θ synchronized with the period of the AC voltage command. Filter 255 passes a portion of not greater than zero of sine wave sin θ synchronized with the period of the AC voltage command.

Multiplier 256 multiples an output of adder 252 by an output of filter 254. In other words, multiplier 256 outputs the product of a portion of not less than zero (a portion of positive polarity) of sine wave sin θ and (1+compensation amount/V*).

Multiplier 257 multiplies an output of subtractor 253 by an output of filter 255. In other words, multiplier 256 outputs the product of a portion of not greater than zero (a portion of negative polarity) of sine wave sin θ and (1−compensation amount/V*).

Adder 258 adds an output of multiplier 256 and an output of multiplier 257. When sine wave sin θ is positive, the output of filter 255 is zero, and accordingly, the output of multiplier 257 is also zero. The output of adder 258 thus matches the output of multiplier 256. In other words, the product of sin θ and (1+compensation amount/V*) is output. On the other hand, when sine wave sin θ is negative, the output of filter 254 is zero, and accordingly, the output of multiplier 256 is also zero. The output of adder 258 thus matches the output of multiplier 257. In other words, the product of sine and (1−compensation amount/V*) is output.

Multiplier 259 multiplies amplitude V* of the AC voltage command by the output of adder 258. Inverter voltage command Vinv* is output from multiplier 259.

When sine wave sin θ is positive, the product of sin θ and (1+compensation amount/V*) is output from adder 258. Thus, a command obtained by superimposing the product of sin θ and the compensation amount on the AC voltage command (i.e., the product of V* and sin θ) is output from multiplier 259 as inverter voltage command Vinv*. Since sin θ is positive, sin θ is equal to the absolute value of sin θ. Thus, a command obtained by superimposing the product of the absolute value of sin θ and the compensation amount on the AC voltage command is output from multiplier 259 as inverter voltage command Vinv*.

On the other hand, when sine wave sin θ is negative, the product of sin θ and (1−compensation amount/V*) is output from adder 258. Thus, the command obtained by superimposing the product of the absolute value of sin θ and the compensation amount on the AC voltage command (i.e., the product of V* and sin θ) is output from multiplier 259 as inverter voltage command Vinv*.

In this manner, feedback controller 205 according to Embodiment 2 also determines, as inverter voltage command Vinv*, the AC voltage command on Which the product of the absolute value of sine wave sin θ synchronized with the period of the AC voltage command and the compensation amount is superimposed, as in Embodiment 1. Consequently, effects similar to those of Embodiment 1 are achieved.

In the above description, computation unit 52 and divider 251 are separately provided. Alternatively, computation unit 52 may perform computations including the division by divider 251 and output compensation amount/V* described above. In this case, divider 251 is omitted.

Embodiment 3

Figure 10:
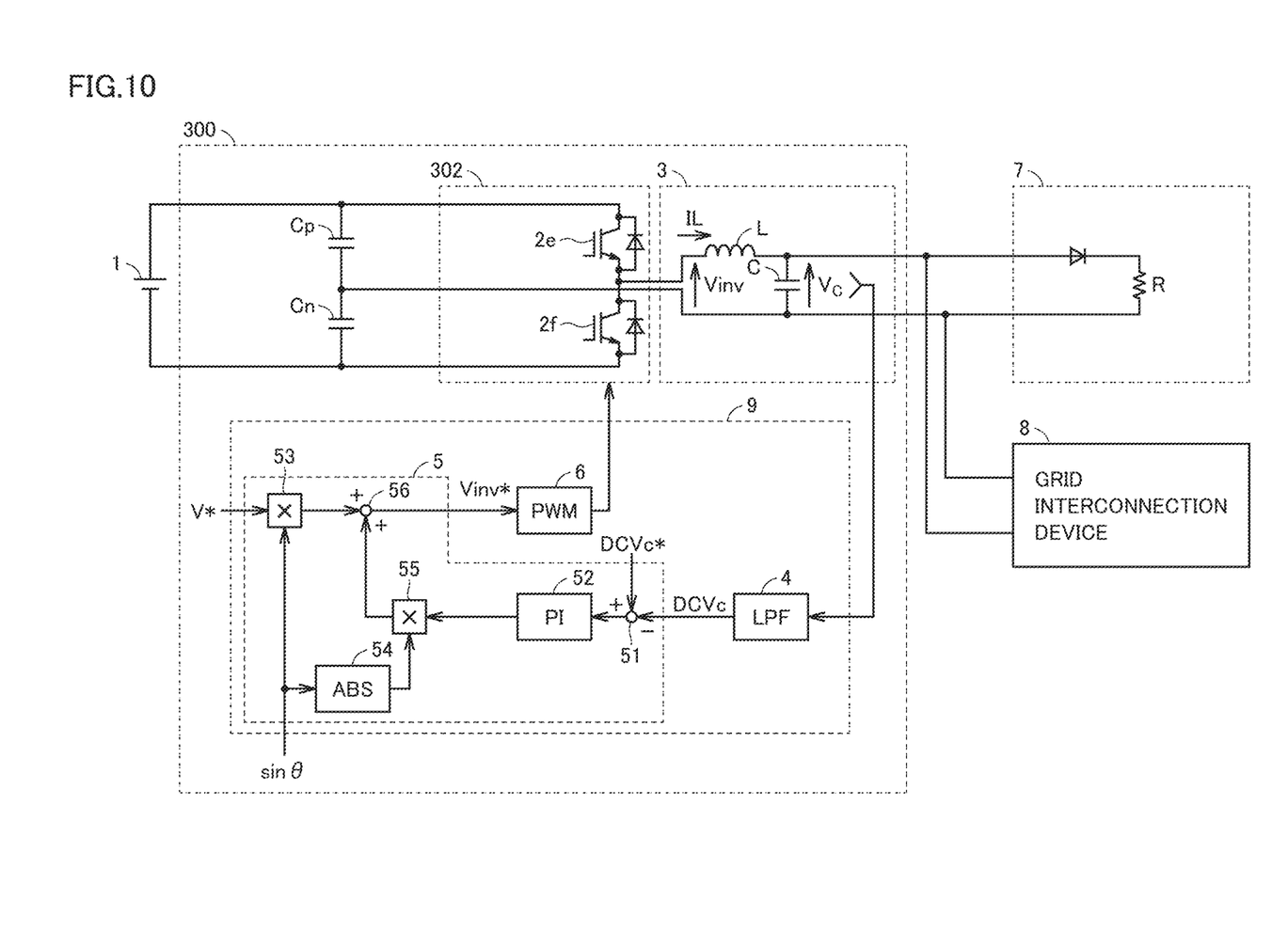
FIG. 10 shows a configuration of a power conversion device according to Embodiment 3.

FIG. 10 shows a configuration of a power conversion device according to Embodiment 3. A power conversion device 300 shown in FIG. 10 differs from power conversion device 100 shown in FIG. 1 in that it includes capacitors Cp, Cn and also includes an inverter 302 in place of inverter 2.

Capacitors Cp, Cn are connected in series between input terminals connected to DC power supply 1 and divide an input voltage. Capacitor Cp has one end connected to a positive terminal of the input terminals connected to DC power supply 1. Capacitor Cn has one end connected to a negative terminal of the input terminals connected to DC power supply 1. The other ends of capacitors Cp, Cn are connected to each other.

Inverter 302 is a half-bridge inverter and includes one leg including semiconductor switching elements 2e, 2f connected in series. Semiconductor switching elements 2e, 2f are alternately controlled to be turned on and off. Thus, AC inverter voltage Vinv is generated between a point of connection between capacitor Cp and capacitor Cn and a point of connection between semiconductor switching element 2e and semiconductor switching element 2f.

Alto in power conversion device 300 according to Embodiment 3, feedback controller 5 determines, as inverter voltage command Vinv*, the AC voltage command on which the product of the absolute value of sine wave sin θ synchronized with the period of the AC voltage command and the compensation amount is superimposed. Consequently, Embodiment 3 achieves effects similar to those of Embodiment 1.

Embodiment 4

The power conversion devices according to Embodiments 1 to 3 supply single-phase AC power. In contrast, a power conversion device according to Embodiment 4 supplies three-phase AC power using a three-phase, four-line system.

Figure 11:
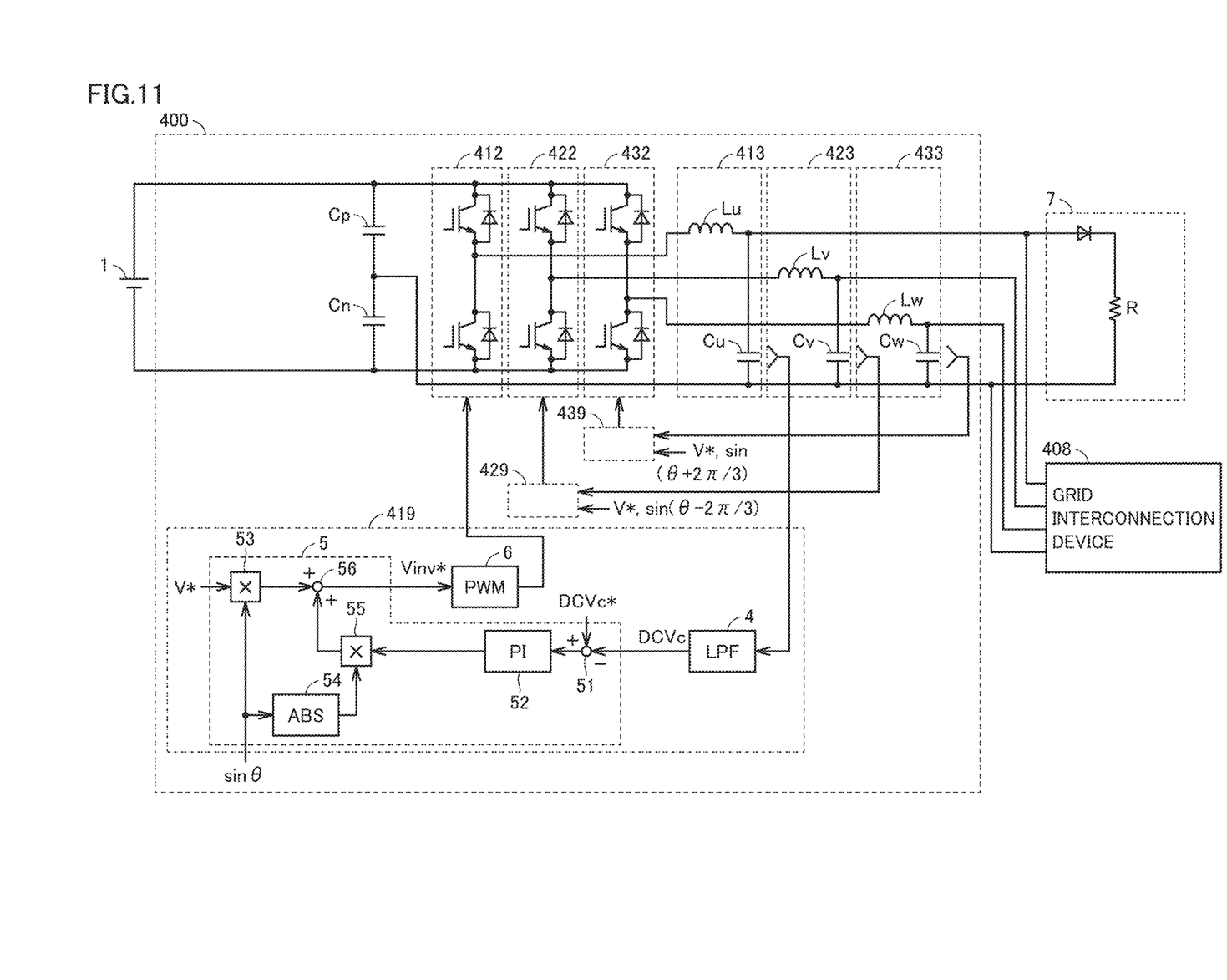
FIG. 11 shows a configuration of a power conversion device according to Embodiment 4.

FIG. 11 shows a configuration of the power conversion device according to Embodiment 4. A power conversion device 400 shown in FIG. 11 is connected with, for example, a grid interconnection device 408 having a three-phase, four-line configuration.

As shown in FIG. 11, power conversion device 400 includes capacitors Cp, Cn, three inverters 412, 422, 432, three filters 413, 423, 433, and three inverter control circuits 419, 429, 439.

Inverter 412, filter 413, and inverter control circuit 419 constitute a circuit that receives an input voltage from DC power supply 1, performs power conversion, and supplies U-phase AC power. Inverter 422, filter 423, and inverter control circuit 429 constitute a circuit that receives an input voltage from DC power supply 1, performs power conversion, and supplies V-phase AC power. Inverter 432, filter 433, and inverter control circuit 439 constitute a circuit that receives an input voltage from DC power supply 1, performs power conversion, and supplies W-phase AC power.

As in Embodiment 3, capacitors Cp, Cn are connected in series between the input terminals connected to DC power supply 1 and divide an input voltage. A point of connection between capacitor Cp and capacitor Cn is connected with a neutral line.

Each of inverters 412, 422, 432, which has a configuration similar to that of inverter 302 of Embodiment 3, is a half-bridge inverter.

Filters 413, 423, 433, each of which has a configuration similar to that of filter 3 of Embodiment 1, are LC filters including inductors Lu, Lv, Lw and capacitors Cu, Cv, Cw, respectively.

Each of inverter control circuits 419, 429, 439 has a configuration similar to that of inverter control circuit 9 of Embodiment 1. In other words, each of inverter control circuits 419, 429, 439 includes detector 4, feedback controller 5, and PWM controller 6. However, AC voltage commands out of phase by $2\pi/3$ with respect to one another are input to the respective feedback controllers 5 included in inverter control circuits 419, 429, 439. In other words, the phases of the AC voltage commands received by feedback controllers 5 of inverter control circuits 429, 439 differ by $-2\pi/3$ and $+2\pi/3$, respectively, from the phase of the AC voltage command received by feedback controller 5 of inverter control circuit 419. Specifically, the sine waves synchronized with the periods of the AC voltage commands received by feedback controllers 5 of inverter control circuits 419, 429, 439 are $\sin\theta$, $\sin(\theta-2\pi/3)$, and $\sin(\theta+2\pi/3)$, respectively.

In each of inverter control circuits 419, 429, 439, a target value DCVc* corresponding to the offset error of detector 4 is input to subtractor 51.

Also in power conversion device 400 according to Embodiment 4, feedback controller 5 corresponding to each phase determines, as inverter voltage command Vinv*, the AC voltage command on which the product of the absolute value of the sine wave synchronized with the period of the AC voltage command and the compensation amount is superimposed. Consequently, Embodiment 4 achieves effects similar to those of Embodiment 1.

Power conversion device 400 according to Embodiment 4 supplies three-phase AC power. In the configuration corresponding to the multi-phase AC output, thus, power conversion device 400 can suppress DC component DCVc generated in accordance with load 7 without significantly changing the positive half-wave period and the negative half-wave period. As a result, a grid interconnection device having the active isolated operation function can be effectively utilized without stopping during the isolated operation.

In FIG. 11, load 7 is provided in a path in parallel with capacitor Cu. However, load 7 may be provided in any of a path in parallel with capacitor Cv, a path in parallel with capacitor Cw, a path in parallel with a series of capacitor Cu and capacitor Cv, a path in parallel with a series of capacitor Cv and capacitor Cw, and a path in parallel with a series of capacitor Cu and capacitor Cw. Further, load 7 is not limited to a single-phase configuration and may have any of a three-phase, three-line load configuration and a three-phase, four-line load configuration. Grid interconnection device 408 may have a three-phase, three-line configuration.

Embodiment 5

Figure 12:
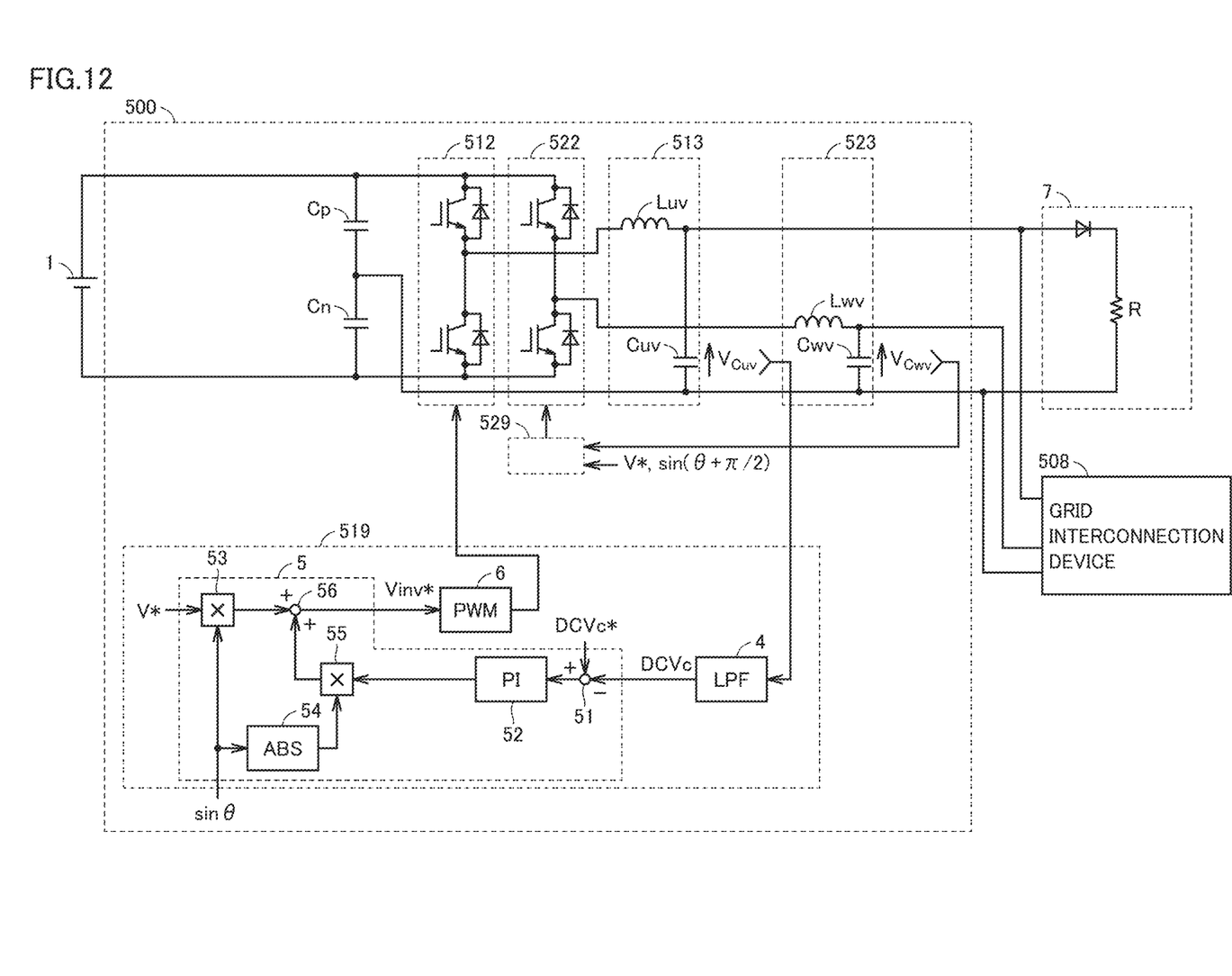
FIG. 12 shows a configuration of a power conversion device according to Embodiment 5.

FIG. 12 shows a configuration of a power conversion device according to Embodiment 5. A power conversion device 500 according to Embodiment 5, which is a modification of power conversion device 400 of Embodiment 4, has a V-phase installation configuration. Power conversion device 500 shown in FIG. 12 is connected with, for example, a grid interconnection device 508 of three-phase, three-line configuration.

As shown in FIG. 12, power conversion device 500 includes capacitors Cp, Cn, two inverters 512, 52.2, two filters 513, 523, and two inverter control circuits 519, 529.

As in Embodiment 3, capacitors Cp, Cn are connected in series between the input terminals connected to DC power supply 1 and divide an input voltage. A point of connection between capacitor Cp and capacitor Cn is connected with a V-phase line.

Inverter 512, filter 513, and inverter control circuit 519 constitute a circuit that receives an input voltage from DC power supply 1, performs power conversion, and supplies U-phase AC power. Inverter 522, filter 523, and inverter control circuit 529 constitute a circuit that receives an input voltage from DC power supply 1, performs power conversion, and supplies W-phase AC power.

Each of inverters 512, 522, which has a configuration similar to that of inverter 302 of Embodiment 3, is a half-bridge inverter.

Filters 513, 523, each of which has a configuration similar to that of filter 3 of Embodiment 1 are LC filters including inductors Luv, Lwv and capacitors Cuv, Cwv, respectively.

Each of inverter control circuits 519, 529 has a configuration similar to that of inverter control circuit 9 of Embodiment 1. In other words, each of inverter control circuits 519, 529 includes detector 4, feedback controller 5, and PWM controller 6. However, the phase of the AC voltage command received by feedback controller 5 included in inverter control circuit 529 differs by $\pi/2$ from the phase of the AC voltage command received by feedback controller 5 included in inverter control circuit 519. In other words, the sine waves synchronized with the periods of the AC voltage commands input to feedback controllers 5 of inverter control circuits 519, 529 are denoted by $\sin\theta$ and $\sin(\theta+\pi/2)$, respectively.

Further, in each of inverter control circuits 519, 529, target value DCVc* corresponding to the offset error of detector 4 is input to subtractor 51.

Also in power conversion device 500 according to Embodiment 5, feedback controller 5 corresponding to each phase determines, as inverter voltage command Vinv*, the AC voltage command on which the product of the absolute value of the sine wave synchronized with the period of the AC voltage command and the compensation amount is superimposed. Consequently, Embodiment 5 achieves effects similar to those of Embodiment 4.

In FIG. 12, load 7 is provided in a path in parallel with capacitor Cuv. However, load 7 may be provided in any of a path in parallel with capacitor Cwv and a path in parallel with a series of capacitor Cuv and capacitor Cwv. Further, load 7 is not limited to the single-phase configuration and may have the three-phase, three-line load configuration.

Embodiment 6

Figure 13:
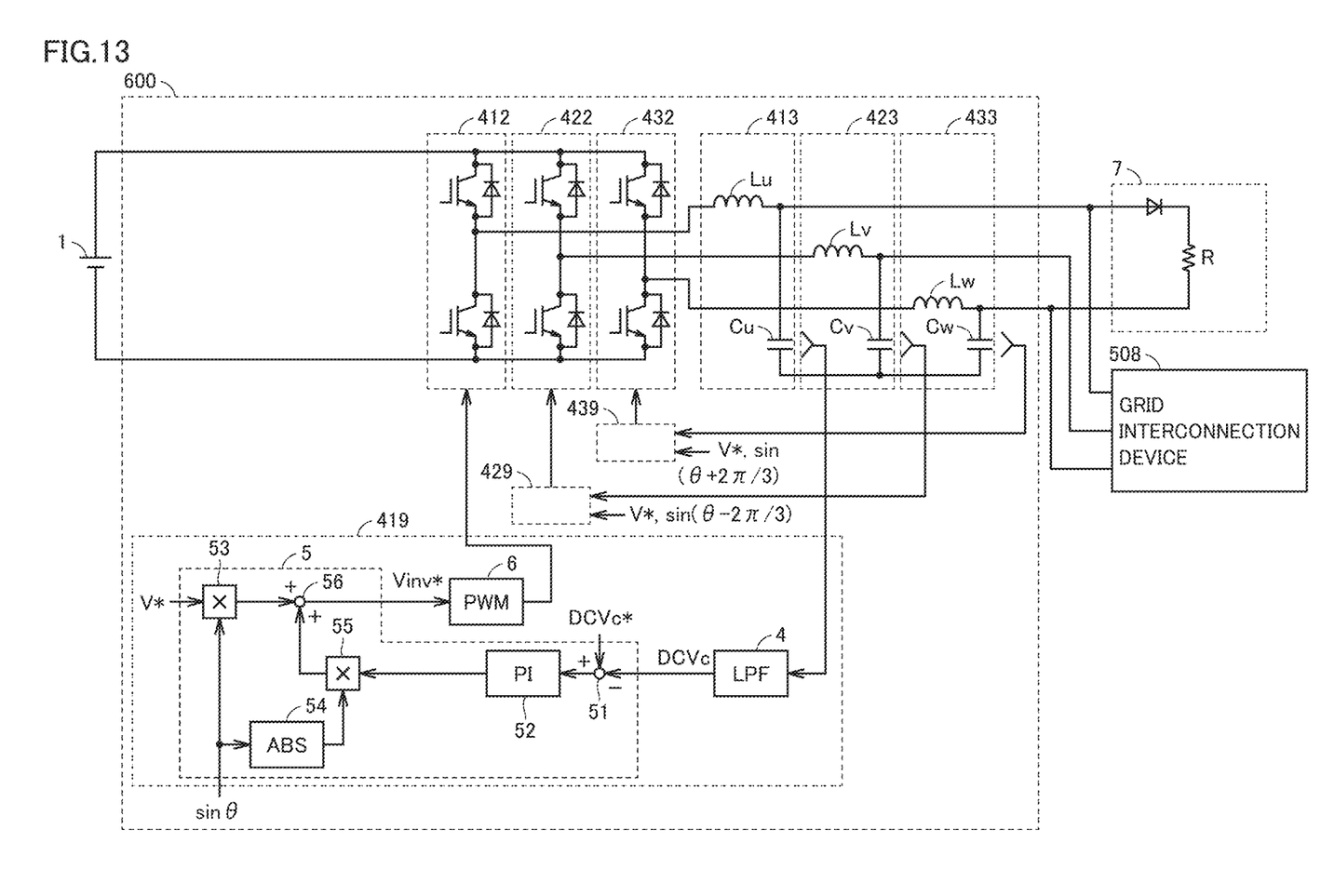
FIG. 13 shows a configuration of a power conversion device according to Embodiment 6.

FIG. 13 shows a configuration of a power conversion device according to Embodiment 6. A power conversion device 600 according to Embodiment 6, which is a modification of power conversion device 400 of Embodiment 4, supplies three-phase AC power of three-phase, three-line system. Power conversion device 600 shown in FIG. 13 is connected with, for example, grid interconnection device 508 having the three-phase, three-line configuration.

As shown in FIG. 13, power conversion device 600 differs from power conversion device 400 shown in FIG. 11 in that capacitors Cp, Cn and the neutral line are omitted.

Also in power conversion device 600 according to Embodiment 6, feedback controller 5 corresponding to each phase determines, as inverter voltage command Vinv*, the AC voltage command on which the product of the absolute value of the sine wave synchronized with the period of the AC voltage command and the compensation amount is superimposed. Consequently, Embodiment 6 achieves effects similar to those of Embodiment 4.

In FIG. 13, load 7 is provided in a path in parallel with a series of capacitor Cu and capacitor Cw. However, load 7 may be provided in any of a path in parallel with a series of capacitor Cv and capacitor Cw and a path in parallel with a series of capacitor Cu and capacitor Cv. Further, load 7 is not limited to the single-phase configuration and may have the three-phase, three-line load configuration.

Power conversion device 300 according to Embodiment 3 may include feedback controller 205 according to Embodiment 2 in place of feedback controller 5. In the power conversion devices according to Embodiments 4 to 6, inverter control circuits 419, 429, 439, 519, 529 may have a configuration similar to that of inverter control circuit 209 according to Embodiment 2.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST

1 DC power supply; 2, 302, 412, 422, 432, 512, 522 inverter; 2a-2f semiconductor switching element; 3, 254, 255, 413, 423, 433, 513, 523 filter; 4 detector; 4a voltage detector; 4b low-pass filter; 5, 205, 905 feedback controller; 6 PWM controller; 7 load; 8, 408, 508 grid interconnection device; 9, 209, 419, 429, 439, 519, 529, 909 inverter control circuit; 51, 253 subtractor; 52 computation unit; 53, 55, 256, 257, 259 multiplier; 54 absolute value circuit; 56, 252, 258, 956 adder; 100, 200, 300, 400, 500, 600, 900 power conversion device; 251 divider; C, Cn, Cp, Cu, Cur, Cv, Cw, Cwv capacitor; L, Lu, Luv, Lv, Lw, Lwv inductor.

The invention claimed is:

1. A power conversion device comprising at least one circuit to receive a DC input voltage and perform power conversion, wherein
each of the at least one circuit includes
an inverter to receive the DC input voltage and generate an inverter voltage,
a filter to receive the inverter voltage and output an output voltage,
a detector to detect a DC component of the output voltage,
a feedback controller to receive an AC voltage command and the DC component and determine an inverter voltage command such that the DC component is equal to a target value, and
a PWM controller to receive the inverter voltage command and perform pulse width modulation control of the inverter,
the target value is zero or a value corresponding to an offset error of the detector, and
the feedback controller
computes a compensation amount for compensating for the DC component, and
determines, as the inverter voltage command, the AC voltage command on which a product of an absolute value of a sine wave and the compensation amount is superimposed, the sine wave being synchronized with a period of the AC voltage command.

2. The power conversion device according to claim 1, wherein
the feedback controller includes
a first multiplier to multiply an amplitude of the AC voltage command by the sine wave,
an absolute value circuit to output the absolute value of the sine wave,
a second multiplier to multiply the absolute value by the compensation amount, and
an adder to add an output of the first multiplier and an output of the second multiplier, and
the inverter voltage command is output from the adder.

3. The power conversion device according to claim 1, wherein
the feedback controller includes
a first filter unit to pass a portion of not less than zero of the sine wave,
a second filter unit to pass a portion of not greater than zero of the sine wave,
a first adder to add, to one, a value obtained by dividing the compensation amount by an amplitude of the AC voltage command,
a subtractor to subtract, from one, the value obtained by dividing the compensation amount by the amplitude of the AC voltage command,
a first multiplier to multiply an output of the first filter unit by an output of the first adder,
a second multiplier to multiply an output of the second filter unit by an output of the subtractor,
a second adder to add an output of the first multiplier and an output of the second multiplier, and
a third multiplier to multiply the amplitude by an output of the second adder, and
the inverter voltage command is output from the third multiplier.

4. The power conversion device according to claim 1, wherein the feedback controller further includes a computation unit to calculate the compensation amount by PI computation using a deviation between the DC component and the target value.

5. The power conversion device according to claim 1, wherein
the at least one circuit includes a first circuit, a second circuit, and a third circuit, and
a phase of the AC voltage command received by the feedback controller included in the second circuit and a phase of the AC voltage command received by the feedback controller included in the third circuit differ by $-2\pi/3$ and $+2\pi/3$, respectively, from a phase of the AC voltage command received by the feedback controller included in the first circuit.

6. The power conversion device according to claim 1, wherein
the at least one circuit includes a first circuit and a second circuit, and
a phase of the AC voltage command received by the feedback controller included in the second circuit differs by $\pi/2$ from a phase of the AC voltage command received by the feedback controller included in the first circuit.

7. The power conversion device according to claim 2, wherein the feedback controller further includes a computation unit to calculate the compensation amount by PI computation using a deviation between the DC component and the target value.

8. The power conversion device according to claim 3, wherein the feedback controller further includes a computation unit to calculate the compensation amount by PI computation using a deviation between the DC component and the target value.

9. The power conversion device according to claim 2, wherein
the at least one circuit includes a first circuit, a second circuit, and a third circuit, and a phase of the AC voltage command received by the feedback controller included in the second circuit and a phase of the AC voltage command received by the feedback controller included in the third circuit differ by −2π/3 and +2π/3, respectively, from a phase of the AC voltage command received by the feedback controller included in the first circuit.

10. The power conversion device according to claim 3, wherein
the at least one circuit includes a first circuit, a second circuit, and a third circuit, and
a phase of the AC voltage command received by the feedback controller included in the second circuit and a phase of the AC voltage command received by the feedback controller included in the third circuit differ by −2π/3 and +2π/3, respectively, from a phase of the AC voltage command received by the feedback controller included in the first circuit.

11. The power conversion device according to claim 4, wherein
the at least one circuit includes a first circuit, a second circuit, and a third circuit, and
a phase of the AC voltage command received by the feedback controller included in the second circuit and a phase of the AC voltage command received by the feedback controller included in the third circuit differ by −2π/3 and +2π/3, respectively, from a phase of the AC voltage command received by the feedback controller included in the first circuit.

12. The power conversion device according to claim 2, wherein
the at least one circuit includes a first circuit and a second circuit, and
a phase of the AC voltage command received by the feedback controller included in the second circuit differs by π/2 from a phase of the AC voltage command received by the feedback controller included in the first circuit.

13. The power conversion device according to claim 3, wherein
the at least one circuit includes a first circuit and a second circuit, and
a phase of the AC voltage command received by the feedback controller included in the second circuit differs π/2 from a phase of the AC voltage command received by the feedback controller included in the first circuit.

14. The power conversion device according to claim 4, wherein
the at least one circuit includes a first circuit and a second circuit, and
a phase of the AC voltage command received by the feedback controller included in the second circuit differs by π/2 from a phase of the AC voltage command received by the feedback controller included in the first circuit.

* * * * *